(12) United States Patent
Díaz

(10) Patent No.: US 6,762,679 B1
(45) Date of Patent: Jul. 13, 2004

(54) REMOTE MONITORING ADAPTER FOR LEVELMETER

(75) Inventor: Herman Díaz, Atizapan (MX)

(73) Assignee: TRN Business Trust, Dallas, TX (US)

( * ) Notice: Subject to any disclaimer, the term of this patent is extended or adjusted under 35 U.S.C. 154(b) by 432 days.

(21) Appl. No.: 09/706,956

(22) Filed: Nov. 6, 2000

(51) Int. Cl.[7] .............................................. G01F 23/00
(52) U.S. Cl. ......................... 340/524; 73/317; 73/314; 702/55
(58) Field of Search .............................. 73/49.2, 290 R, 73/317, 314, 311, 322.5, 305; 702/55, 100; 417/36, 43; 340/870.3

(56) References Cited

U.S. PATENT DOCUMENTS

| | | | |
|---|---|---|---|
| 1,963,330 A | | 6/1934 | Lumme .......................... 73/37 |
| 2,127,422 A | * | 8/1938 | Phaneuf ....................... 177/311 |
| 3,148,542 A | * | 9/1964 | Clift ............................. 73/308 |
| 3,824,587 A | | 7/1974 | Fowler ........................ 340/347 |
| 3,949,606 A | | 4/1976 | Blancett ....................... 73/229 |
| 4,051,726 A | | 10/1977 | Hastbacka .................... 73/290 |
| 4,065,968 A | | 1/1978 | Sunagawa ..................... 73/313 |
| 4,090,092 A | | 5/1978 | Serrano ....................... 307/116 |
| 4,134,022 A | | 1/1979 | Jacobsen ..................... 250/577 |
| 4,242,590 A | | 12/1980 | von Tlück ................... 250/577 |
| 4,290,059 A | * | 9/1981 | Noyes et al. ............... 340/624 |
| 4,354,180 A | * | 10/1982 | Harding ...................... 340/619 |
| 4,422,328 A | | 12/1983 | Luchessa et al. ............. 73/313 |
| 4,427,132 A | | 1/1984 | Thomson ...................... 222/23 |
| 4,433,577 A | * | 2/1984 | Khurgin et al. ............... 73/290 |
| 4,459,584 A | | 7/1984 | Clarkson ..................... 340/624 |
| 4,598,742 A | | 7/1986 | Taylor .......................... 141/95 |
| 4,638,305 A | | 1/1987 | Sutton ......................... 340/620 |
| 4,688,028 A | * | 8/1987 | Conn .......................... 340/625 |
| 4,706,203 A | | 11/1987 | Ramsdale et al. ........... 364/509 |
| 4,723,122 A | * | 2/1988 | Maltby et al. ......... 340/870.38 |
| 4,786,846 A | | 11/1988 | Uchida ........................ 318/482 |

(List continued on next page.)

FOREIGN PATENT DOCUMENTS

| | | |
|---|---|---|
| GB | 2 147 697 A | 5/1995 |
| WO | WO 00/02015 | 1/2000 |

OTHER PUBLICATIONS

PCT Notification of Transmittal of the International Search Report or the Declaration and International Search Report re International Appln. PCT/US 01/50966 (6 pages), Sep. 16, 2002.
Notification of Transmittal of International Search Report mailed Jul. 18, 2003 corresponding to International Application No. PCT/US01/05966 filed Nov. 6, 2001.
Notification of Transmittal of International Search Report mailed Sep. 19, 2001 corresponding to International Application No. PCT/US 01/40816 filed May 25, 2001.
Notification of Transmittal of International Search Report mailed Apr. 10, 2003 corresponding to International Application No. PCT/IB02/05314 filed Dec. 12, 2002.

*Primary Examiner*—Michael Horabik
*Assistant Examiner*—Hung Dang
(74) *Attorney, Agent, or Firm*—Baker Botts L.L.P.

(57) ABSTRACT

An adapter for a mechanical type levelmeter, which has a magnet that moves in response to a changing level of liquid in a container. The adapter is fitted onto the levelmeter in a manner that is transparent to any existing reading dials, but that permits hall sensors on the adapter to respond to the motion of the magnet. The adapter also has a processing unit and a transmitter, which process the output of hall sensors and generate a transmittable signal representing level data.

19 Claims, 3 Drawing Sheets

U.S. PATENT DOCUMENTS

| | | | | |
|---|---|---|---|---|
| 4,859,987 A | | 8/1989 | Markus | 340/450 |
| 4,873,863 A | * | 10/1989 | Bruhl et al. | 73/49.2 |
| 4,888,989 A | | 12/1989 | Homer | 73/304 |
| 4,912,976 A | | 4/1990 | Labriola, II | 73/290 |
| 4,950,998 A | | 8/1990 | Kramer et al. | 324/674 |
| 4,977,528 A | | 12/1990 | Norris | 364/571 |
| 4,983,855 A | | 1/1991 | Grimes | 250/577 |
| 4,989,970 A | * | 2/1991 | Campbell et al. | 356/73 |
| 5,035,581 A | | 7/1991 | McGuire et al. | 417/36 |
| 5,042,299 A | | 8/1991 | Wells | 73/304 |
| 5,043,912 A | | 8/1991 | Reus | 364/509 |
| 5,073,720 A | * | 12/1991 | Brown | 250/577 |
| 5,105,085 A | | 4/1992 | McGuire et al. | 250/343 |
| 5,117,693 A | | 6/1992 | Duksa | 73/317 |
| 5,136,883 A | | 8/1992 | Jannotta | 73/309 |
| 5,154,079 A | * | 10/1992 | Lupoli | 73/308 |
| 5,156,048 A | | 10/1992 | DeFigueiredo et al. | 73/308 |
| 5,251,482 A | | 10/1993 | Bates et al. | 73/290 |
| 5,257,090 A | * | 10/1993 | Meinzer et al. | 356/358 |
| 5,265,032 A | | 11/1993 | Patel | 364/509 |
| 5,275,951 A | | 1/1994 | Chow et al. | 436/50 |
| 5,279,157 A | | 1/1994 | Mattis et al. | 73/290 |
| 5,297,423 A | | 3/1994 | Keating et al. | 73/49 |
| 5,309,212 A | | 5/1994 | Clark | 356/5 |
| 5,351,036 A | | 9/1994 | Brown et al. | 340/618 |
| 5,351,548 A | | 10/1994 | Briggs et al. | 73/718 |
| 5,502,377 A | | 3/1996 | Freund | 324/175 |
| 5,535,625 A | | 7/1996 | Levy | 73/290 |
| 5,539,670 A | | 7/1996 | Maltby et al. | 364/550 |
| 5,609,059 A | | 3/1997 | McEwan | 73/290 |
| 5,636,548 A | | 6/1997 | Dunn et al. | 73/313 |
| 5,642,097 A | * | 6/1997 | Martel | 340/618 |
| 5,648,844 A | | 7/1997 | Clark | 356/5.09 |
| 5,705,733 A | | 1/1998 | Jannotta | 73/1 |
| 5,742,055 A | * | 4/1998 | Lee | 250/353 |
| 5,747,824 A | * | 5/1998 | Jung et al. | 250/577 |
| 5,751,611 A | | 5/1998 | Jamieson | 364/573 |
| 5,755,136 A | | 5/1998 | Getman et al. | 73/290 |
| 5,842,374 A | | 12/1998 | Chang | 73/290 |
| 5,880,480 A | | 3/1999 | Ellinger et al. | 250/577 |
| 5,895,848 A | | 4/1999 | Wilson et al. | 73/290 |
| 5,975,102 A | | 11/1999 | Schalk | 137/2 |
| 6,040,897 A | * | 3/2000 | Clifford et al. | 356/4.01 |
| 6,052,190 A | | 4/2000 | Sckowski et al. | 356/376 |
| 6,239,709 B1 | | 5/2001 | Dykstra et al. | 340/618 |
| 6,272,911 B1 | | 8/2001 | Hinkle | 73/118 |
| 6,336,362 B1 | | 1/2002 | Duenas | 73/313 |

* cited by examiner

US 6,762,679 B1

REMOTE MONITORING ADAPTER FOR LEVELMETER

TECHNICAL FIELD OF THE INVENTION

This invention relates to measurement devices, and more particularly to an adapter for a levelmeter, which enables the levelmeter to be remotely monitored.

BACKGROUND OF THE INVENTION

Level sensing is used for a vast number of applications, perhaps the most familiar being for tanks containing liquids, such as fuel tanks. A limit levelmeter (also known as a switch levelmeter) provides readings at one or more predetermined levels. For example, a limit levelmeter may provide a reading only at a predetermined low level. A continuous levelmeter provides a continuous range of measurements from empty to full.

There are many different types of level meters, each type having a different principle of operation. Some of the more common types are float levelmeters, capacitive levelmeters, photoelectric levelmeters, and ultrasonic levelmeters.

Most levelmeters are designed to provide a readout at the meter. However, in light of today's ever increasing data networking capabilities, there is a demand for remote monitoring. Today, this is typically accomplished by removing a mechanical reading dial and replacing it with an electronic data device.

SUMMARY OF THE INVENTION

One aspect of the invention is a remote monitoring adapter for use with a levelmeter. It is assumed that the levelmeter is a mechanical device having a rotating magnet that operates a read out mechanism, such as a needle dial. The adapter comprises a probe having thin flat plate upon which is mounted at least one hall sensor operable to respond to motion of the magnet. The probe is of a size and shape suitable for insertion between the magnet and the read out mechanism. The adapter also has a processing unit that receives an output signal from each hall sensor and converts the sensor output to digital data representing a level of liquid. A transmitter is operable to provide a signal that represents the digital data and that may be transmitted to a remote monitoring unit.

One advantage of the invention is that the adapter does not modify the performance of the original levelmeter. In other words, the levelmeter's reading dial may still be read in the same manner as before installation of the adapter. Installation of the adapter is simple and quick. It can be installed in a tank already containing liquid; it is not necessary to empty the tank before installation.

The adapter is a low cost device. It can make either digital or analog readings, and can measure both liquid level and rate of consumption.

DETAILED DESCRIPTION OF THE INVENTION

Figure 1:
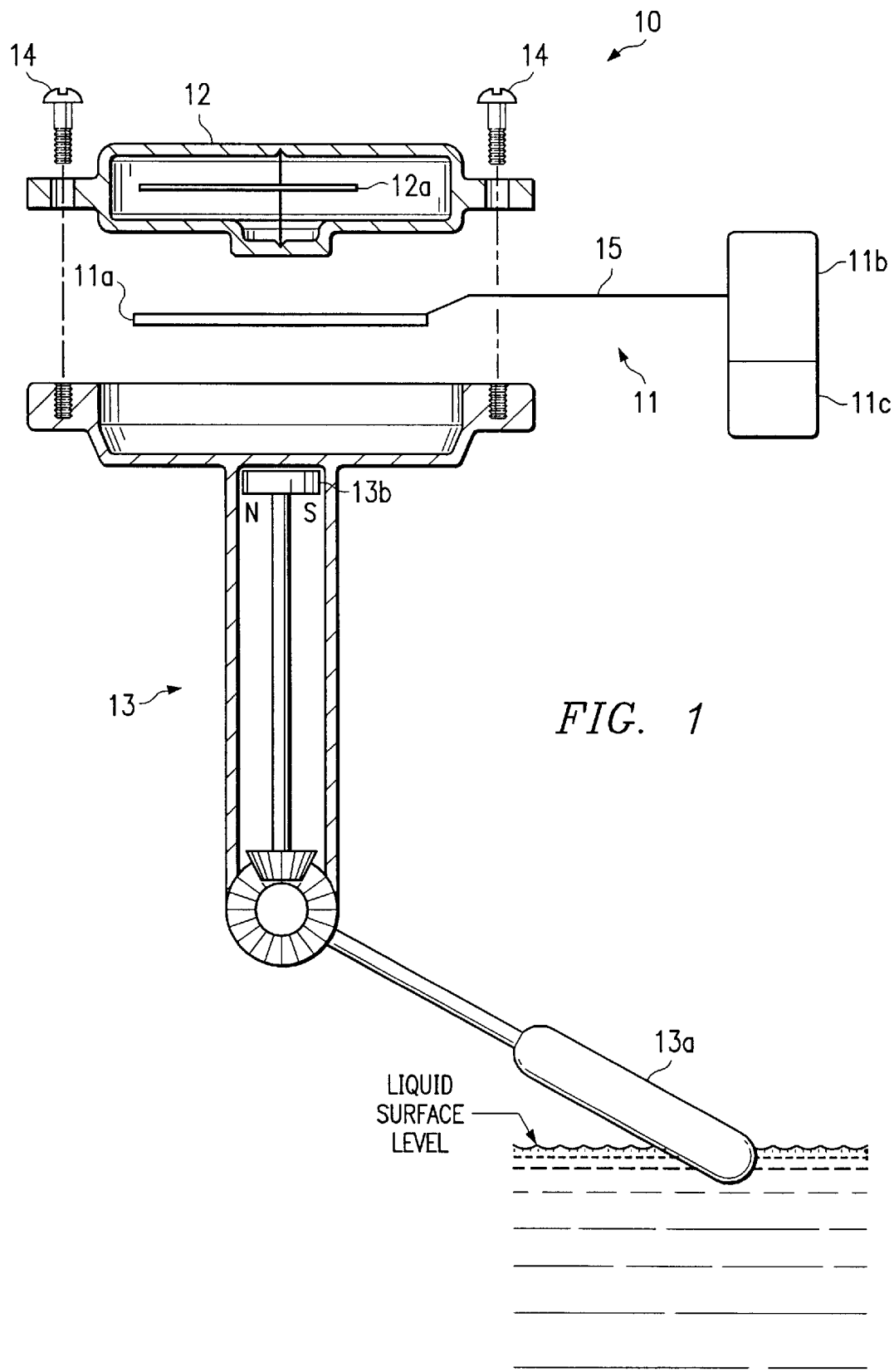
FIG. 1 illustrates a levelmeter having a remote monitoring adapter in accordance with the invention.

FIG. 1 illustrates a levelmeter 10 having a remote monitoring adapter 11, in accordance with the invention. Although, not explicitly illustrated, it is assumed that levelmeter is installed in a container of some sort, which contains liquid. For purposes of this description, it is assumed that the container is a tank. FIG. 1 indicates the surface level of the liquid within the tank under the levelmeter 10 at float 13b.

As explained below, the basic principle of operation of adapter 11 is the use of an adapter having a sensor probe that is inserted under the readout dial of a conventional levelmeter. The probe reads the magnetic field fluctuations generated by a rotating magnet associated with the levelmeter's float. Although levelmeter 10 is a float type meter in the example of this description, any levelmeter having a mechanism that activates a magnet in the same manner as magnet 13b could be used with adapter 11.

Levelmeter 10 has two main components: a reading dial 12 and a main body 13. It is assumed that reading dial 12 can be removed and replaced on the main body 13. This may be accomplished with screws 14 or various other attachment means.

The main body's float 13a float on the surface of the liquid and moves up or down according to the liquid level in the container. A rotating magnet 13b has a mechanical connection to the float 13a that causes magnet 13b to rotate in response to movement of float 13a. A needle 12a within reading dial 12 moves in response to the motion of magnet 13b. In the example of this description, the rotation of magnet 13b and of needle 12a are in a plane parallel to the liquid surface, but other configurations are possible. For example, the reading dial 12 could be oriented at right angles to the surface, with magnet 13b and probe 11a repositioned accordingly.

Adapter 11 has three main components: a probe 11a, processing unit 11b, and transmitter 11c. As explained below, the internal configuration of these components vary depending on whether adapter 11 provides a digital or analog output. A digital output is the type of output associated with limit or switch type levelmeters. An analog output permits continuous level information.

Probe 11a is essentially a thin flat plate, upon which is mounted one or more hall sensors, as described below in connection with FIGS. 2A and 2B. Probe 11a has a size and shape suitable to permit it to be placed between reading dial 12 and the main body 13. Probe 11a may be easily implemented as a printed circuit board.

Probe 11a is transparent to the magnetic field generated by magnet 13b. This transparency avoids interference with reading dial 12. Accordingly, probe 11a is made from a non-ferromagnetic material such as a plastic, aluminum, or ceramic material.

However, probe 11a reads the magnetic field generated by magnet 13b, producing current and voltage signals proportional to that field. A cable 15 connects probe 11a to processing unit 11b.

Processing unit 11b performs signal amplification, conditioning, timing. It generates digital level data, which may represent either a discrete level or a rate of consumption. It also provides the power supply for adapter 11. Processing unit 11b is further described below in connection with FIGS. 3A–3C.

Transmitter 11c receives the digital data from processing unit 11b and generates a signal suitable for transmission to a remote receiver. The transmission may be wireless or by means of cables or some other data network medium.

Figure 2A:
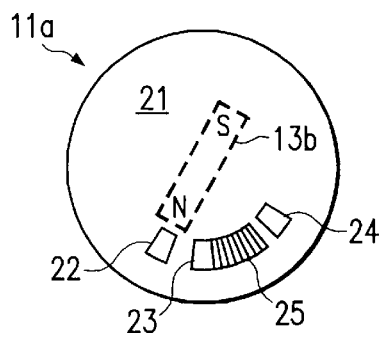
FIG. 2A illustrates a digital version of the probe of the adapter of FIG. 1.

FIG. 2A illustrates a digital version of probe 11a. The location of magnet 13b under probe 11a is indicated with dotted lines. As explained below, this version of probe 11a provides both a single level reading, as well as a rate of consumption. However, probe 11a could be configured with an appropriate sensor (or sensors) for only one of these types of readings. Also, additional sensors could be used to obtain additional readings for different levels of fullness.

In the digital version of FIG. 2A, three hall sensors 22–24 are placed on plate 21, together with a magnetic field stretcher 25. For the digital version of probe 11a, sensors 22–24 are switch type sensors. Hall sensor 22 switches on when the north pole of magnet 13b approaches it. Typically, sensor 22 is positioned relative to magnet 13b so that it switches on when the tank has a predetermined "low" level of fullness. As indicated below, this low level may be the level allowable before an alarm indicates need for a refilling the tank. For example, the low level may be the level at which the tank is only 20% full.

Hall sensors 23 and 24 are used to determine the rate of consumption of the liquid within the tank. To do this, processing unit 11a makes one reading of the level at exact time periods. When sensor 24 switches on, processing unit 11b counts how many time periods elapse before sensor 23 switches on. The number of time periods is proportional to the inverse of the consumption rate. The distance between sensor 24 and sensor 23 on plate 21 may be small to reduce the counting time.

The counterclockwise movement of magnet 13b represents the tank being emptied. Ferromagnetic insert stretches the magnetic field to avoid a dead zone between sensors 24 and 23. Insert 25 is an alternative to hysteresis of the switches because readings are made only when processing unit 11b gives a read command, the reading takes only a few seconds, and processing unit 11b puts adapter 11 in a "sleep" mode interrupting the power supply to probe 11a. Insert 25 may be implemented with very small pieces of ferromagnetic material placed on or within plate 21, thereby stretching the magnetic field and providing hysteresis and linearization.

Figure 2B:
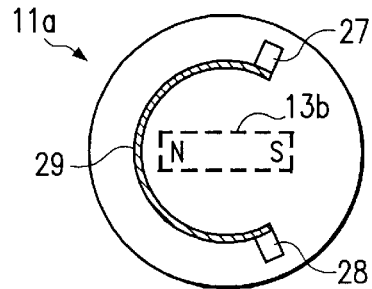
FIG. 2B illustrates an analog version of the probe of the adapter of FIG. 1.

FIG. 2B illustrates an analog version of probe 11a. Two linear hall sensors 27 and 28 are placed on opposite sides of a ferro-magnetic strip, allowing differential readings of the magnetic field generated by magnet 13b. Differential readings are advantageous due to the variation of magnet strength from one magnet to another and their aging process. The magnet placement calculates the position of magnet 13b independent of the strength of that magnet because the measurement is radiometric. Processing unit 13b then calculates the readings of sensor 27 and compares it with the sum of both sensors 27 and 28. Those values are proportional to the position of magnet 13b relative to sensor 27.

In the analog version of FIG. 2B, if the reading of sensor 27 is one-half the sum, magnet 13b is halfway between sensors 27 and 28. Field stretcher 29 makes more linear the relationship between the angular movement of the magnet 13b and the output of processing unit 11b. Field stretcher 29 may be fabricated from a thin layer of ferro-magnetic material.

Hall type sensors are characterized by their sensitivity to both static and dynamic magnetic fields. Any type of sensor falling within this category may be used.

Figure 3A:
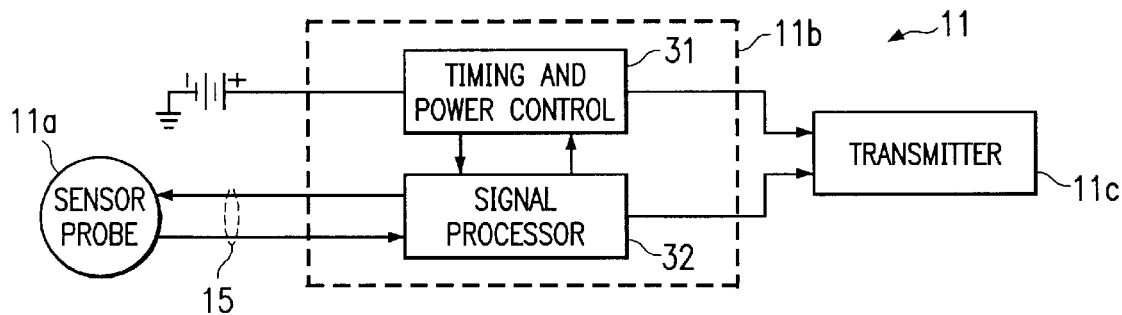
FIG. 3A illustrates the adapter of FIG. 1 in further detail.

FIG. 3A illustrates adapter 11 in further detail. The hall sensors in probe 11a (described above in connection with FIGS. 2A and 2B) are energized for only a few seconds. Power from processing unit 11b may be provided according to the number of readings in a set time period, such as one day. A timing and power control unit 31 sends energy from a battery to processing unit 11b and to transmitter 11c.

As stated above, probe 11a is connected to processing unit 11b by means of a cable 15, such as a multi-wire cable. Ground and positive voltage are provided by processing unit 11b. Each hall sensor of probe 11a provides an associated output signal, which is carried to processing unit 11b by cable 15. The outputs of the hall sensors 11a are processed by signal processor 32. The type of processing depends on whether probe 11a is configured for digital or analog operation.

Figure 3B:
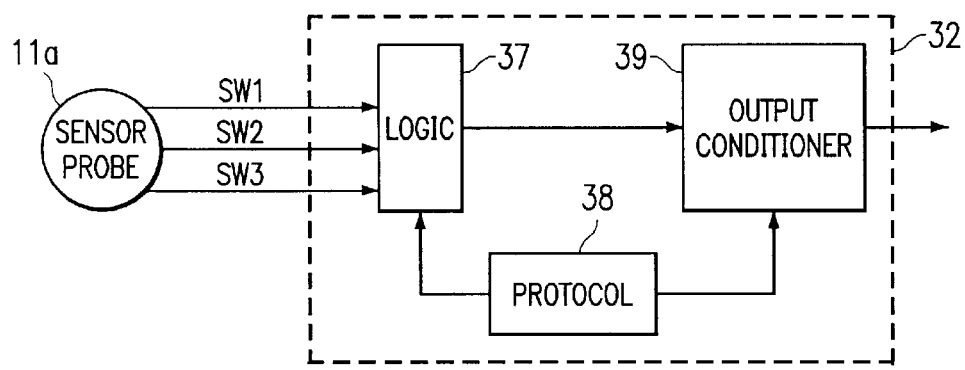
FIG. 3B illustrates a digital version of the processing unit of the adapter of FIGS. 1 and 3.

FIG. 3B illustrates signal processor 32 when probe 11a provides digital signals. A simple combinatorial logic unit 37 provides decisions according to the technique described above in connection with FIG. 2A. A protocol unit 38 performs tasks associated with rate evaluation, such as providing transmission of the information when necessary to get a level-time relationship preset according to the requirements of the system. It may also be used to prevent false evaluations of the consumption rate if the container is partially refilled. Output conditioner 39 adjusts the logic levels to those required by transmitter 11c.

Figure 3C:
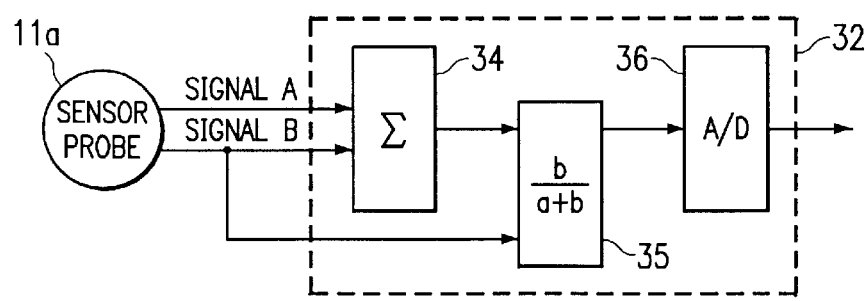
FIG. 3C illustrates an analog version of the processing unit of the adapter of FIGS. 1 and 3.

FIG. 3C illustrates signal processor 32 when probe 11a provides analog signals. The two hall sensors in probe 11a have two output signals (a and b). Appropriate logic elements 34 and 35 calculate the sum of both signals and the ratio of signal b to the sum. The output is then converted to a digital word by analog to digital converter 36.

Regardless of whether probe 11a is digital or analog, the output of processing unit 11b is digital data that represents the level of the liquid contained in the tank. Transmitter 11c provides an appropriate interface to whatever transmission means is desired.

The liquid level data can be transmitted to a remote monitor to request refilling of the tank from a service provider or to otherwise inform a remote site of the level of the liquid within the tank. The transmission may use various intermediate devices; for example, the output signal from transmitter 11c may be used to operate an automatic telephone dialers. Various data communications systems may be used, such as by wire or radio frequency link.

Figure 4:
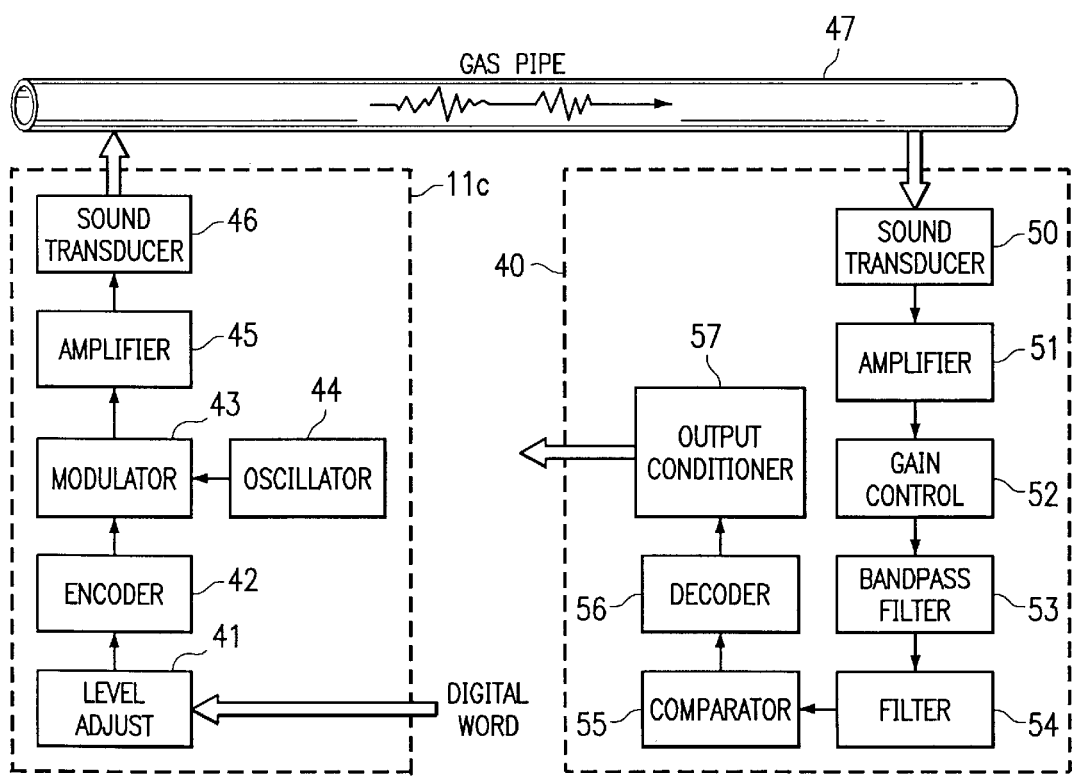
FIG. 4 illustrates a method of transmitting the monitoring signal over a pipeline.

FIG. 4 illustrates one embodiment of a transmission system, which uses a pipeline as a sound wave propagation medium. The remote monitoring signal is delivered as a complex digital signal in the form of sonic waves. Sound waves are desirable because sound travels more efficiently in solids, especially metals, than in air or liquids. The molecules in a solid are more tightly packed and sound waves are mechanical waves.

For example, the container with which levelmeter 10 is used might be a liquid propane tank. Such tanks have associated gas pipes, which deliver gas from the tank to appliances inside the building being served by the tank. It is also possible that the gas pipes might be linked to remote sites.

At adapter end of the pipeline communication system, transmitter 11c has a level adjuster 42, which conditions the digital word from processing unit 11b. For example, 0=x volts and 1=y volts. Encoder 43 forms a new digital word with the original level data and an identification code. Modulator 43 modulates the frequency of the output of oscillator 44, a frequency corresponding to the resonant frequency of the transducer-pipe-transducer system. The output of modulator 43 is amplified by amplifier 45, which drives the sound transducer 46.

From transmitter 11c, the sonic signal travels along pipe 47 to the sound transducer 51 in the receiver 40. An amplifier 51 amplifies the signal to an automatic gain control unit 52, which provides selective extra gain. Band pass filter 53, which is tuned to the frequency of the oscillator 44 in transmitter 11c. Filtering by a period discriminator 54 provides additional noise immunity. Comparator 55 reshapes the square waveforms, which are analyzed by decoder 56. An output conditioner 57 has a digital latch to sustain the decoded information.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A remote monitoring adapter for use with a levelmeter having a magnet that moves in response to varying levels of liquid in a container, comprising:

a probe having a thin flat plate for placement proximate to the magnet and having a first hall sensor mounted on the plate operable to respond to motion of the magnet;

a processing unit that receives an output signal from the first hall sensor and converts it to digital level data;

a transmitter operable to receive the digital level data and to generate a remotely transmittable signal containing the digital level data; and wherein the first hall sensor and a second hall sensor are positioned a distance apart and relative to the magnet such that the processing unit calculates a rate of consumption, and wherein the digital level data represents the rate of consumption.

2. The adapter of claim 1, wherein the plate and the first hall sensor are fabricated as a printed circuit board.

3. The adapter of claim 1, wherein the first hall sensor is positioned relative to the magnet such that the hall sensor switches on when the liquid level reaches a certain level, and wherein the digital level data represents that level.

4. The adapter of claim 1, wherein the processing unit has a counter for determining how much time elapses between switching of the first and second hall sensors.

5. The adapter of claim 1, wherein the probe provides a digital output representing a discrete liquid level.

6. The adapter of claim 1, wherein the probe provides an analog output representing a liquid level along a continuous range of levels, and wherein the digital level data represents that level.

7. The adapter of claim 1, wherein the processing unit and the transmitter are housed separately from the levelmeter.

8. The adapter of claim 1, wherein the levelmeter has a reading mechanism activated by the magnet, and wherein the probe is transparent to the reading mechanism to minimize interference with the reading mechanism.

9. A levelmeter for measuring the surface level of liquid in a container, comprising:

a float operable to rise and fall with the surface level;

a magnet mechanically attached to the float, such that the magnet moves in response to the float;

a probe having a first hall sensor and placed near the magnet such the first hall sensor responds to motion of the magnet;

a processing unit that receives an output signal from the first hall sensor and converts it to a digital level data;

a transmitter unit that generates a remotely transmittable signal representing the digital level data; and wherein the first hall sensor and a second hall sensor are positioned a distance apart and relative to the magnet such that the processing unit calculates a rate of consumption, and wherein the digital level data represents the rate of consumption.

10. The levelmeter of claim 9, wherein the probe provides a digital output representing a discrete liquid level.

11. The levelmeter of claim 9, wherein the probe provides an analog output representing a liquid level along a continuous range of levels, and wherein the digital level data represents that level.

12. The levelmeter of claim 9, wherein the first hall sensor is positioned relative to the magnet such that the hall sensor switches on when the liquid level reaches a certain level, and wherein the digital level data represents that level.

13. A method of providing a signal transmittable to a remote location that represents the level of liquid in a container, comprising the steps of:

installing a levelmeter in the container, the level meter having at least a mechanism for activating a magnet that moves in response to the level of the liquid and having a probe with a first hall sensor that responds to motion of the magnet;

wherein the first hall sensor and a second hall sensor are positioned a distance apart and relative to the magnet such that the processing unit calculates a rate of consumption;

receiving an output signal from the probe;

processing the output signal to provide digital data representing the level of liquid in the container; and transmitting the digital data to a remote location, and wherein the digital level data represents the rate of consumption.

14. The method of claim 13, wherein the probe provides a digital output representing a discrete liquid level.

15. The method of claim 13, wherein the probe provides an analog output representing a liquid level along a continuous range of levels, and wherein the digital level data represents that level.

16. The method of claim 13, further comprising the step of transmitting the signal along a pipeline associated with the container.

17. A method of providing a signal transmittable to a remote location that represents the rate of consumption of liquid in a container, comprising the steps of:

installing a levelmeter in the container, the level meter having a least a mechanism for activating a magnet that moves in response to the level of the liquid and having a probe with at least two hall sensors that respond to motion of the magnet;

receiving an output signal from the probe;

processing the output signal to provide digital data representing the rate of consumption of liquid in the container; and transmitting the digital data to a remote location.

18. The method of claim 17, wherein the processing step is performed by counting the time elapsed between signals provided by the hall sensors.

19. The method of claim 18, further comprising the step of transmitting the signal along a pipeline associated with the container.

* * * * *